(12) United States Patent
Teeling

(10) Patent No.: US 11,709,084 B2
(45) Date of Patent: Jul. 25, 2023

(54) MULTI-RESERVOIR LIQUID DISPENSER AND ASSOCIATED METHODS

(71) Applicant: Delaware Capital Formation, Inc., Wilmington, DE (US)

(72) Inventor: Matthew Teeling, Andover (GB)

(73) Assignee: Delaware Capital Formation, Inc., Wilmington, DE (US)

( * ) Notice: Subject to any disclaimer, the term of this patent is extended or adjusted under 35 U.S.C. 154(b) by 102 days.

(21) Appl. No.: 17/359,704

(22) Filed: Jun. 28, 2021

(65) Prior Publication Data

US 2021/0404853 A1    Dec. 30, 2021

Related U.S. Application Data

(60) Provisional application No. 63/045,292, filed on Jun. 29, 2020.

(51) Int. Cl.
  *G01F 11/32* (2006.01)
  *B67D 3/02* (2006.01)
  *B65D 83/00* (2006.01)

(52) U.S. Cl.
  CPC .......... *G01F 11/32* (2013.01); *B65D 83/0022* (2013.01); *B67D 3/02* (2013.01); *B65D 2583/005* (2013.01)

(58) Field of Classification Search
  CPC ....... G01F 11/32; B65D 83/0022; B65D 3/02; B65D 2583/005; A47K 5/12; A47K 5/1202; A47K 5/1204; A47K 5/1207
  USPC .............................. 222/129.3, 132, 134, 105
  See application file for complete search history.

(56) References Cited

U.S. PATENT DOCUMENTS

| | | | | |
|---|---|---|---|---|
| 1,260,334 A | * | 3/1918 | Cordley ................. | G01F 11/32 222/453 |
| 2,093,365 A | * | 9/1937 | Ransom ................. | G01F 11/32 141/117 |
| 2,453,080 A | * | 11/1948 | Shimp .................... | G01F 11/32 222/453 |
| 2,519,115 A | * | 8/1950 | Costakos ............... | G01F 11/32 251/156 |
| 2,751,254 A | * | 6/1956 | Kraft ..................... | G01F 11/32 239/398 |
| 2,842,294 A | * | 7/1958 | Crowder ................ | G01F 11/32 222/510 |

(Continued)

*Primary Examiner* — Paul R Durand
*Assistant Examiner* — Michael J. Melaragno
(74) *Attorney, Agent, or Firm* — Fish & Richardson P.C.

(57) ABSTRACT

A liquid dispenser includes a housing configured to receive a liquid supply cartridge, and a reservoir disposed in the housing that holds a volume of the product. The reservoir includes an access port for receiving the liquid supply cartridge and placing the liquid supply cartridge and the reservoir in communication. A dosing tank is connected to the reservoir and configured to hold a metered volume of the product. A control valve is movable between an opened position and a closed position, wherein when the control valve is in the opened position, product in the dosing tank is permitted to flow from the liquid dispenser and product flow from the reservoir to the dosing tank is prevented, and when the control valve is in the closed position, product in the dosing tank is prevented from flowing from the liquid dispenser and product flow from the reservoir to the dosing tank is permitted.

32 Claims, 8 Drawing Sheets

(56) References Cited

U.S. PATENT DOCUMENTS

| | | | | |
|---|---|---|---|---|
| 3,987,791 A * | 10/1976 | Chittenden | | A61J 1/2089 |
| | | | | 222/129 |
| 4,005,807 A * | 2/1977 | Wiesner | | B67D 3/02 |
| | | | | 222/442 |
| 4,146,156 A * | 3/1979 | Cassia | | A47K 5/1208 |
| | | | | 141/330 |
| 4,210,262 A * | 7/1980 | Donaldson | | G01F 11/32 |
| | | | | 222/445 |
| 4,210,263 A * | 7/1980 | Bos | | G01F 11/32 |
| | | | | 222/453 |
| 4,345,627 A * | 8/1982 | Cassia | | A47K 5/1208 |
| | | | | 222/325 |
| 4,391,309 A * | 7/1983 | Steiner | | A47K 5/1208 |
| | | | | 141/330 |
| 4,971,231 A * | 11/1990 | Faerber | | G01F 11/32 |
| | | | | 222/541.2 |
| 5,022,558 A * | 6/1991 | Faerber | | G01F 11/32 |
| | | | | 222/105 |
| 5,215,214 A * | 6/1993 | Lev | | B65D 81/3222 |
| | | | | 222/541.9 |
| 5,638,989 A * | 6/1997 | Ophardt | | A47K 5/1207 |
| | | | | 222/105 |
| 9,919,323 B2 * | 3/2018 | Kurchev | | A47K 5/1207 |
| 10,688,507 B2 * | 6/2020 | Kurchev | | B05B 15/65 |
| 2007/0295753 A1 * | 12/2007 | Vangeel | | G01F 11/025 |
| | | | | 222/207 |
| 2012/0308405 A1 * | 12/2012 | McNulty | | B05B 7/0025 |
| | | | | 29/888.02 |
| 2013/0056552 A1 * | 3/2013 | Teeling | | A61L 9/12 |
| | | | | 239/102.2 |
| 2016/0221010 A1 * | 8/2016 | Kurchev | | B05B 7/02 |
| 2018/0236469 A1 * | 8/2018 | Kurchev | | A47K 5/1207 |
| 2020/0197966 A1 * | 6/2020 | Marshall | | B05B 11/0056 |
| 2021/0008576 A1 * | 1/2021 | Kurchev | | A47K 5/1207 |
| 2021/0179418 A1 * | 6/2021 | Marshall | | B67D 7/0294 |
| 2021/0404853 A1 * | 12/2021 | Teeling | | B67D 3/0038 |
| 2022/0135393 A1 * | 5/2022 | Marshall | | A47K 5/1202 |
| | | | | 141/39 |

* cited by examiner

MULTI-RESERVOIR LIQUID DISPENSER AND ASSOCIATED METHODS

CROSS-REFERENCE TO RELATED APPLICATION

This application claims the benefit of and priority to U.S. Provisional Application No. 63/045,292 filed Jun. 29, 2020, the disclosure of which is incorporated by reference herein in its entirety.

TECHNICAL FIELD

This invention generally relates to chemical dispensing, and more particularly to a liquid dispenser having multiple in-line reservoirs for holding a supply of chemical for dispensing into a receptacle.

BACKGROUND

The dispensing of liquid chemical products into a receptacle is a common requirement of many industries. By way of example, in the janitorial industry it is often desirable to dispense one or more chemicals, such as detergents, bleaches, disinfectants, sanitizers, etc., for application to floors, countertops, and other surfaces and areas. Such chemicals may be added to a receptacle, such as a spray bottle or a bucket, and mixed with water or other diluent to form a solution. A number of dispensing systems have been developed for this purpose. By way of example, many systems use a refillable or replaceable chemical supply cartridge and a control valve to deliver chemical directly to the receptacle. The control valve may be manual or configured as an electronic valve. In many applications, the system may include a way to meter the amount of chemical being dispensed into the receptacle.

While these chemical dispensing systems operate for their intended purpose, there are a number of drawbacks for which manufacturers and chemical suppliers seek to improve. By way of example, when the chemical supply cartridge runs out of chemical, the chemical dispenser is no longer operational, and the cartridge must be immediately replaced to restore operation of the chemical dispenser. In many cases, replenishment of the chemical supply cartridges is performed on a regular schedule by outside service technicians that come on-site to maintain the janitorial equipment. Should a chemical supply cartridge run out of product before the scheduled time, janitorial personnel must seek alternative sources for their cleaning supplies. This can be frustrating and inconvenient to janitorial personnel and delay cleaning services.

Additionally, metering the amount of chemical being dispensed into a receptacle is often accomplished using electronic means, including various processors and sensors, that sense fluid flow and determine volumetric data. Such electronic means adds a certain layer of complexity to the chemical dispenser that typically results in an increase in manufacturing, operational, and maintenance costs. Moreover, chemical dispensers of this type require a power source, such as a battery or a power outlet. This requirement, in turn, restricts potential locations for the chemical dispenser on the premises (e.g., near a power outlet) or increases operational and maintenance expenses to keep the power source functional.

Therefore, it is desirable to provide an improved chemical dispenser that addresses the shortcomings of current dispenser. More particularly, there is a need for a chemical dispenser that provides an excess amount of chemical so that the dispenser remains operational subsequent to the chemical supply cartridge running out of product. There is also a need for a chemical dispenser that can meter a dose of chemical for dispensing into a receptacle in a manner that avoids complex electronics and power sources.

SUMMARY

A liquid dispenser for dispensing a product includes a housing configured to receive a liquid supply cartridge containing the product to be dispensed and a reservoir disposed in the housing and configured to hold a volume of the product, wherein the reservoir includes an access port for receiving a portion of the liquid supply cartridge and placing the liquid supply cartridge and the reservoir in communication when the liquid supply cartridge is inserted into the housing. The liquid dispenser further includes a dosing tank operatively connected to the reservoir and configured to hold a metered volume of the product and a control valve movable between an opened position and a closed position. When the control valve is in the opened position, product in the dosing tank is permitted to flow from a dispensing end of the liquid dispenser and product flow from the reservoir to the dosing tank is prevented. When the control valve is in the closed position, product in the dosing tank is prevented from flowing from the dispensing end and product flow from the reservoir to the dosing tank is permitted.

In one embodiment, the liquid supply cartridge and the reservoir are configured to have an in-line arrangement within the housing such that product from the liquid supply cartridge is configured to flow through the reservoir as product is dispensed by the liquid dispenser. The reservoir is configured to supply product to the dosing tank when the liquid supply cartridge is depleted of product and thereby allow continued operation of the liquid dispenser even though the liquid supply cartridge is depleted. In an exemplary embodiment, the reservoir has a volume greater than the dosing tank such that the reservoir is able to refill the dosing tank with product multiple times before the reservoir becomes depleted of product.

In one embodiment, the dosing tank further includes a vent having an opened position and a closed position. Movement of the control valve from the closed position to the opened position moves the vent between the closed position and the opened position. The dosing tank also includes a flow restrictor configured to restrict the flow of product from the reservoir to the dosing tank when the control valve is in the closed position. In one embodiment, the flow restrictor includes a diffuser having a diverging configuration in a direction from the reservoir to the dosing tank. The liquid dispenser includes a bayonet connection between the reservoir and the dosing tank.

In one embodiment, the liquid dispenser may include a locking mechanism having a locked position and an unlocked position. In the locked position the liquid supply cartridge is prevented from being removed from the liquid dispenser housing, and wherein in the unlocked position the liquid supply cartridge is removable from the liquid dispenser housing.

In an exemplary embodiment, the control valve may include a two-part valve element movable between the opened and closed position. For example, the two-part valve element may include a shuttle disposed in an interior of the dosing tank and a spigot coupled to the shuttle and extending outside the dosing tank. The spigot may define the dispensing end of the liquid dispenser. In one embodiment, the shuttle includes a tubular body having a first end and a second end and a plug at the first end thereof for occluding the flow of product from the reservoir to the dosing tank when the valve element is in the closed position. The shuttle may further include a blind bore formed in the tubular body open to the second end and extending toward the first end, and a contact plate for engaging the vent and moving the vent from the closed position to the opened position with movement of the valve element from the closed position to the opened position. The plug may include a Y-shaped tip configured to be received in respective slots in the diffuser flow restrictor when the valve element is in the opened position.

In one embodiment, the spigot may include a tubular body having a first end and a second end, a post at the first end, a blind bore formed in the tubular body open the second end and one or more ports extending through a side wall of the tubular body and in communication with the blind bore. The one or more ports are configured to be disposed in the interior of the dosing tank when the valve element is in the opened position. The spigot further includes an engagement plate adjacent the second end, which in one embodiment may include a vent hole or ridges that provide venting of the receptacle.

In one embodiment, the housing of the liquid dispenser may include an outer housing and an inner frame received within the outer housing. The inner frame is configured to support the dosing tank, reservoir, and liquid supply cartridge. The outer housing has a removable bottom wall for accessing the interior of the housing.

In another embodiment, a method of dispensing from a liquid dispenser having a liquid supply cartridge and a control valve, wherein the liquid supply cartridge contains a product to be dispensed and the control valve has an opened position and a closed position. The method includes directing the product from the liquid supply cartridge to a reservoir in the liquid dispenser, directing the product from the reservoir to a dosing tank in the liquid dispenser, and dispensing a metered dose of product from the dosing tank when the control valve is in the opened position.

In one embodiment, the method further includes preventing the flow of product from the reservoir to the dosing tank when the control valve is in the opened position. Moreover, the method may include subjecting the dosing tank to atmospheric pressure and air when the control valve is in the opened position. In this regard, the dosing tank may include a vent having an opened position and a closed position, and wherein movement of the control valve from the closed position to the opened position moves the vent from the closed position to the opened position. According to the method, subsequent to dispensing a metered dose of product from the dosing tank, the dosing tank may be refilled with product from the reservoir. The method may further include restricting the flow of product from the reservoir to the dosing tank during refilling of the dosing tank with product. For example, restricting the flow of product may further include directing the flow of product through a diffuser to increase the fill time of the dosing tank. The method may further include directing air in the dosing tank through the flow restrictor, into the reservoir, and into the liquid supply cartridge during refilling of the dosing tank with product.

Upon depletion of the product in the liquid supply cartridge, the method may include continuing to dispense product from the liquid dispenser using the product stored in the reservoir. In one embodiment, upon depletion of the product in the liquid supply cartridge, the method may include removing the empty liquid supply cartridge from the liquid dispenser and inserting a new liquid supply cartridge into the liquid dispenser. The removing and inserting steps may be performed prior to the product in the reservoir being depleted.

In a further aspect, the liquid dispenser may include a locking mechanism having a locked position and an unlocked position, and the method may further include moving the locking mechanism to the unlocked position prior to removing the liquid supply cartridge from the liquid dispenser and moving the locking mechanism to the locked position subsequent to inserting the new liquid supply cartridge in the liquid dispenser.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
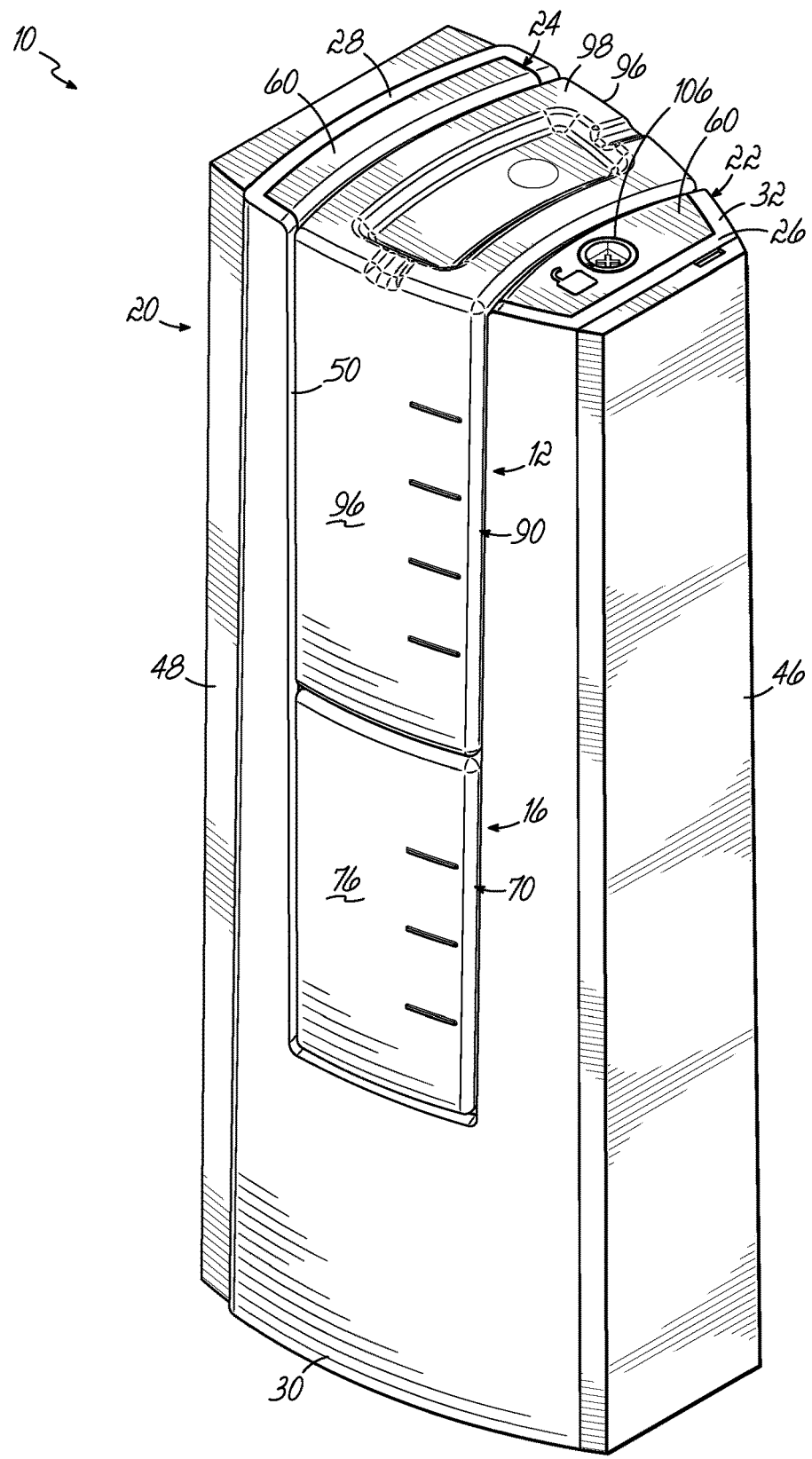
FIG. 1 is perspective view of an exemplary liquid dispenser in accordance with an embodiment of the present invention.
Figure 2:
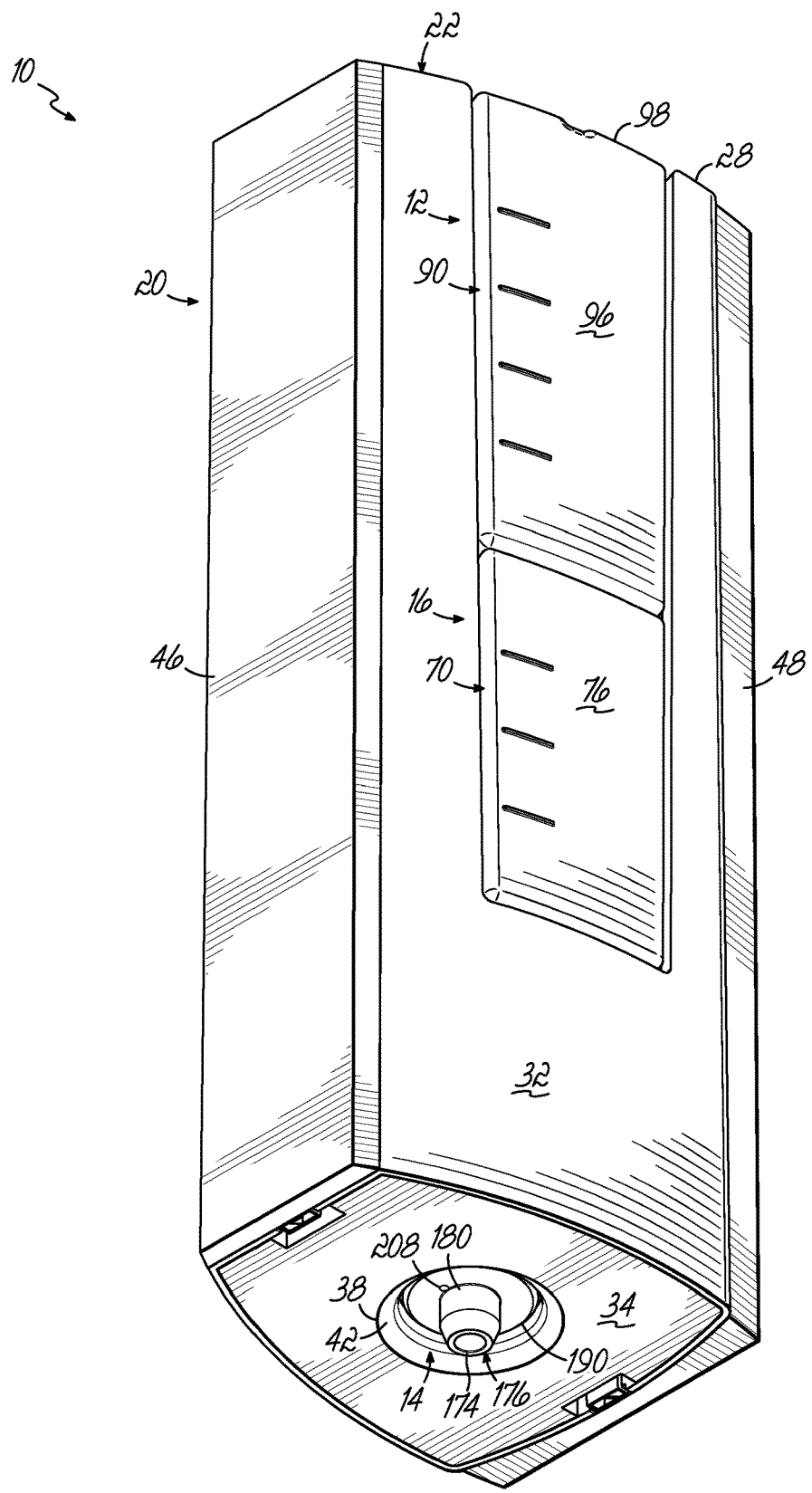
FIG. 2 is another perspective view of the liquid dispenser illustrated in FIG. 1.

With reference to FIGS. 1 and 2, a liquid dispenser 10 in accordance with an embodiment of the invention is illustrated. The liquid dispenser 10 is of the type that utilizes a replaceable liquid supply cartridge 12 with a control valve 14 for dispensing a metered dose of liquid, such as a chemical agent, into a receptacle (not shown). The liquid dispenser 10 includes an in-line reservoir 16 disposed between the liquid supply cartridge 12 and the control valve 14. In this way, the liquid dispenser 10 remains operational even after the liquid supply cartridge 12 runs out of product, due to the supply of product that remains in the reservoir 16. The liquid supply cartridge 12 and the reservoir 16 collectively constitute multiple "reservoirs" for supplying product during operation of the liquid dispenser 10. An empty liquid supply cartridge 12 may then be replaced before the reservoir 16 runs out of product. This maintains the liquid dispenser 10 operational at least for a limited time, even though the liquid supply cartridge 12 is empty. In addition, the liquid dispenser 10 includes a dosing tank 18 (FIG. 5) that ensures a precise amount of liquid is delivered to the receptacle when the control valve 14 is opened. The particular arrangement of the liquid dispenser 10 provides for metering of the liquid without the use of complicated electronics or a power source. Thus, the liquid dispenser 10 represents an improved dispensing solution that addresses some of the drawbacks of dispensing systems currently in the market. Various features of the liquid dispenser 10 will not be described in detail.

Figure 3:
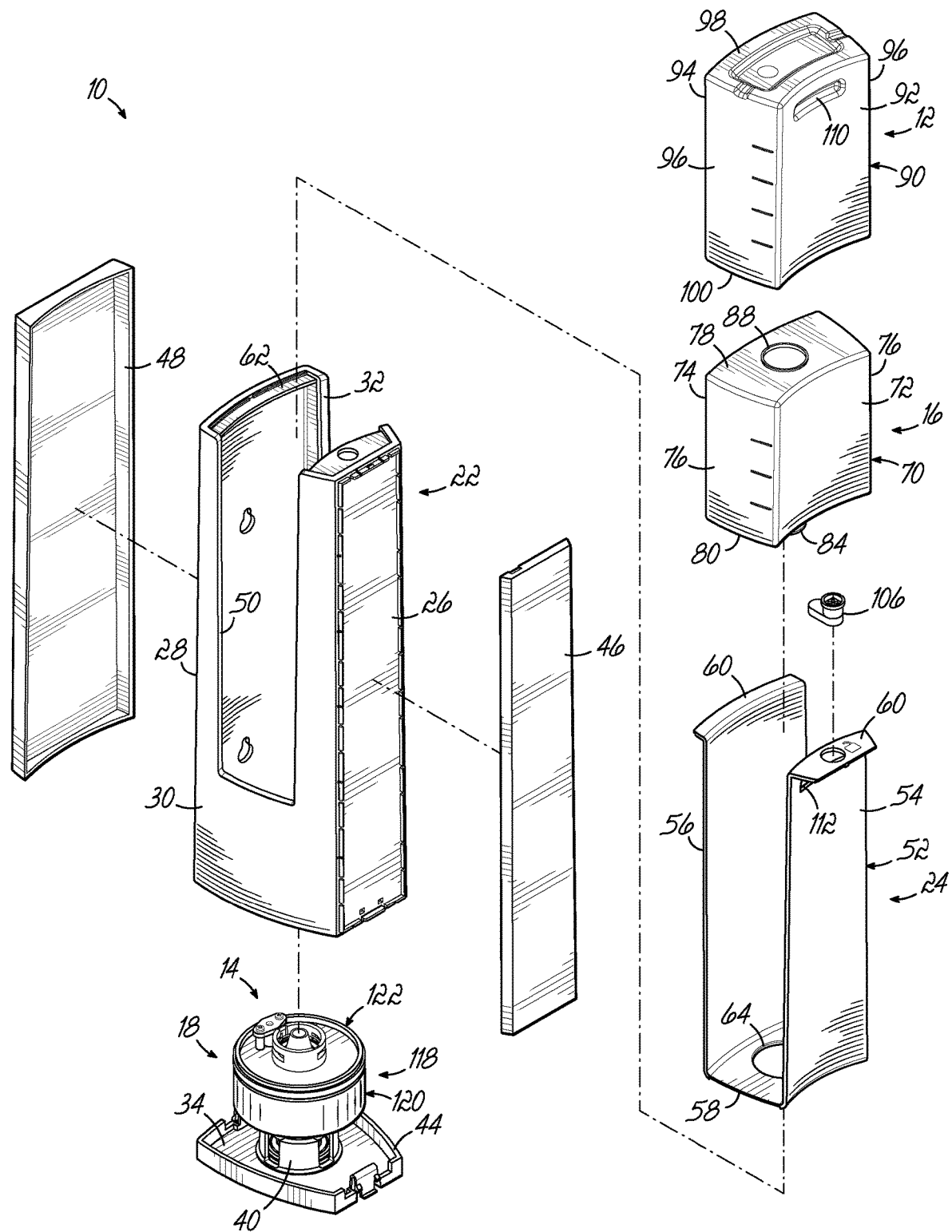
FIG. 3 is a disassembled perspective view of the liquid dispenser illustrated in FIG. 1.

In an exemplary embodiment and in reference to FIGS. 1-3, the liquid dispenser 10 may include a housing 20 for holding the elements of the liquid dispenser 10, including the liquid supply cartridge 12, control valve 14, reservoir 16, and the dosing tank 18. The housing 20 may be generally rectangular or trapezoidal in various embodiments but is not limited to any particular cross-sectional profile. The housing 20 includes an outer housing 22 and an inner frame 24. The outer housing 22 may be generally rectangular or trapezoidal and include a front wall 26, rear wall 28 and opposed side walls 30, 32 extending between the front and rear walls 26, 28. The outer housing 22 may be generally open at its upper end but closed off at its lower end by a base wall 34. In one embodiment, the outer housing 22 may be a monolithic body formed, for example, from a suitable plastic though a molding process. Alternatively, the outer housing 22 may be formed from separate walls or panels that are coupled together, such as by bonding, ultrasonic welding, etc., to form the assembled outer housing 22. In one particular embodiment, for example, the front wall 26, rear wall 28, and side walls 30, 32 may be formed as a monolithic body, such as through a molding process, and the base wall 34 may be a separate element that is coupled to the lower end of those walls, such as by a spring clip or other reasonable element. This allows the base wall 34 to be removed from the outer housing 22 to gain access to an interior 36 (FIG. 5) of the outer housing 22 defined by its various walls.

Figure 4:
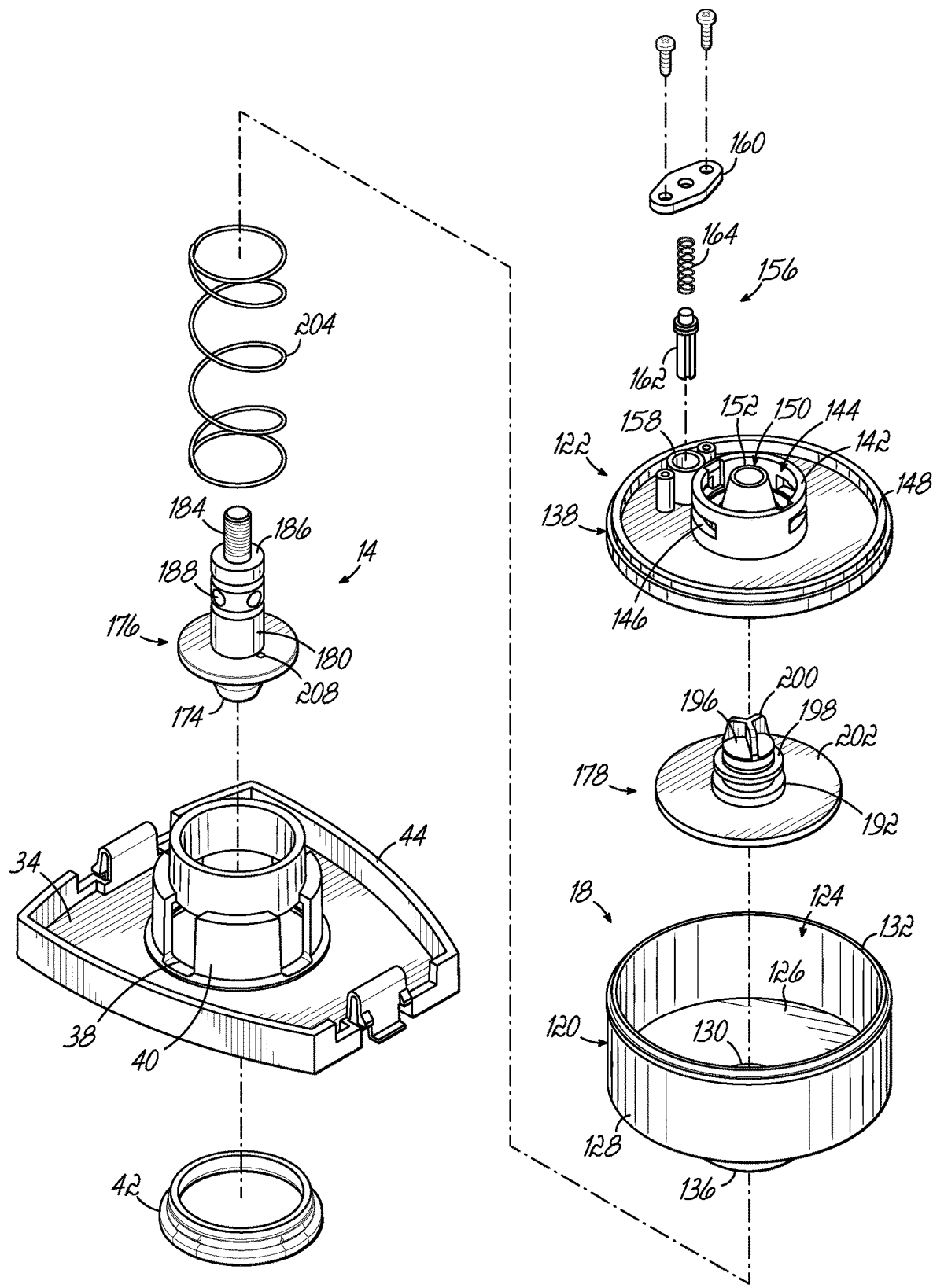
FIG. 4 is a disassembled perspective view of a portion of the liquid dispenser illustrated in FIG. 3.

In one embodiment illustrated in FIG. 4, the base wall 34 includes a central aperture 38 configured to receive a portion of the control valve 14 and a support tube 40 extending away from the base wall 34 and having a passageway open to the central aperture 38. The central aperture 38 may include an inlet ring 42 that facilitates engagement of a receptacle with the control valve 14 of the liquid dispenser 10. In this regard, the inlet ring 42 may include a chamfered inner surface to guide a receptacle into proper engagement with the control valve 14. The base wall 34 may further include an outer flange 44 extending from the base wall 34 to facilitate engagement of the base wall 34 with the outer housing 22. In an exemplary embodiment, the outer flange 44 may include the spring clip or other reasonable element for releasably securing the base wall 34 to the outer housing 22 in a snap-fit manner.

The front wall 26 of the outer housing 22 may include a facia plate 46. The facia plate 46 may be integrally formed with the outer housing 22 or be a separate element which is attached to the outer housing 22. For example, in one embodiment, the facia plate 46 may couple to the outer housing 22 through a snap fit connection that allows the facia plate 46 to be attached or removed in a relatively straight forward manner. In one embodiment, the facia plate 46 may be decorative in nature and include various letters, numbers, symbols, textures, colors, etc. that provide a pleasing appearance to the liquid dispenser 10. The facia plate 46 may be changed out periodically to give the liquid dispenser 10 a different appearance.

The rear wall 28 of the outer housing 22 may include a mounting plate 48 for mounting the liquid dispenser 10 to a wall or other support surface within a facility in which the liquid dispenser 10 is to be used. For example, the liquid dispenser 10 may be configured to couple to a wall or support surface in a janitorial closet or other cleaning area within the facility. The mounting plate 48 may be integrally formed with the outer housing or be a separate element which is attached to the outer housing 22. For example, in one embodiment, the mounting plate 48 may be configured to be connected to the wall or support surface through bonding or by other fastening means (e.g., screws, rivets, clips, etc.). The outer housing 22 may then be configured to be releasably connected to the mounting plate 48. This may allow a service technician, for example, to remove the liquid dispenser 10 from the wall or support surface for maintenance or replacement. In one embodiment, an inner surface of the mounting plate 48 may include one or more studs and the rear surface 28 of the outer housing may include a corresponding one or more apertures that receive the studs in a removable manner. In an alternative embodiment, the liquid dispenser 10 may be configured to connect to the mounting plate 48 via other connectors as recognized by those of ordinary skill in the art.

The side walls 30, 32 of the outer housing 22 may be generally arcuate as the walls extend between the front and rear walls 26, 28. Additionally, the side walls 30, 32 generally converge in a direction from the rear wall 28 toward the front wall 26 since the front wall 26 may have a width that is less than a width of the rear wall 28 (i.e., the liquid dispenser 10 may be wider near the rear of the dispenser as compared to the front of the dispenser). At least one of the side walls 30, 32, and preferably each of the side walls 30, 32, includes a generally U-shaped slot 50 centrally located in the side walls 30, 32 and extending longitudinally from the upper end of the outer housing 22 toward the lower end. The U-shaped slots 50 stop short of the lower end such that the side walls 30, 32 have a continuous width along a lower region of the outer housing 22. As illustrated in these figures, and discussed in more detail below, the purpose of the slots 50 is to allow a user or service technician to visually observe the amount of product in the liquid supply cartridge 12 and the reservoir 16. The slots 50 also allow a service technician to grasp the liquid supply cartridge during a replacement or maintenance process.

The inner frame 24 is configured to be received within the outer housing 22 and internally support the liquid supply cartridge 12, control valve 14, reservoir 16 and dosing tank 18 within the housing 20 of the liquid dispenser 10. As illustrated in the FIGS. 3 and 5, and in an exemplary embodiment, the inner frame 24 may be configured as a U-shaped channel or body 52 and include a front wall 54, a rear wall 56, and a bottom wall 58 extending between the front and rear walls 54, 56. The U-shaped body 52 is generally open at its upper end and along the sides of the body 52 (i.e., side walls that extend between the front and rear walls 54, 56 are generally omitted). In one embodiment, the front and rear walls 54, 56 may be generally arcuate and include a support flange 60 at an upper end of the walls 54, 56. The support flanges 60 are configured to engage with lips or ledges 62 on the front and rear walls 26, 28 of the outer housing 22 to support the inner frame 24 within the outer housing 22. In one embodiment, the inner frame 24 may abut the ledges 62 without a positive connection therebetween (i.e., the flanges 60 rest on the ledges 62 but are not otherwise fixed thereto). Alternatively, the inner frame 24 may be positively connected to the outer housing 22. For example, the flanges 60 and ledges 62 may be secured with an adhesive or other bonding agent, ultra-sonic welding, or other means for fixedly connecting the inner frame 24 to the outer housing 22.

The bottom wall 58 includes a central aperture 64 configured to receive a portion of the reservoir 16 and support the reservoir within the housing 20, as will be explained in more detail below. The central aperture 64 of the bottom wall 58 of the inner frame 24 is configured to generally align with the central aperture 38 in the base wall 34 of the outer housing 22 when the inner frame 24 is received and seated within the outer housing 22. In an exemplary embodiment, the inner frame 24 may be formed from a suitable engineering plastic through, for example, a molding process. Alternatively, the inner frame 24 may be formed from a more durable material, such as a metal. Other materials and processes for forming the inner frame 24 are possible as well.

In an exemplary embodiment, the reservoir 16 is configured to be received within and supported by the inner frame 24 of the housing 20. In this regard, the reservoir 16 includes a generally rectangular body 70 having a front wall 72, rear wall 74, opposed side walls 76, upper wall 78, and lower wall 80 that collectively define an interior 82 for holding a volume of product. The front and rear walls 72, 74 may be generally arcuate to generally match the arcuate front and rear walls 54, 56 of the inner frame 24. For example, the front and rear walls 72, 74 may have a relatively constant radius of curvature. The radius of curvature may be the same or different between the front and rear walls 72, 74. In an exemplary embodiment, the radius of curvature of the rear wall 74 is greater than the radius of curvature of the front wall 72. Additionally, the width of the side walls 76 may be substantially equal to the distance between the front and rear walls 54, 56 of the inner frame 24 such that the reservoir 16 substantially fills the void between the front and rear walls 54, 56. Moreover, the width of the front wall 72 and rear wall 74 may be substantially equal to the width of the respective front and rear walls 54, 56 of the inner frame 24. In one embodiment, the width of the front and rear walls 72, 74 of the reservoir 16 may be slightly greater than the respective widths of the front and rear walls 54, 56 of the inner frame 24.

The lower wall 80 of the body 70 of the reservoir 16 includes a neck 84 extending therefrom that defines a passageway that is open to the interior 82 of the reservoir 16. The neck 84 is sized to be received in the central aperture 64 in the bottom wall 58 of the inner frame 24 and extend therethrough such that the lower wall 80 of the body 70 engages against the bottom wall 58 of the inner frame 24. In this way, the reservoir 16 is supported by the inner frame 24 of the housing 20. For purposes discussed in more detail below, the neck 84 of the body 70 includes a key feature 86 (e.g., one or more outwardly extending tabs or protrusions) and a seal, such as an O-ring disposed about the neck 84. Moreover, the upper wall 78 of the body 70 includes an access port 88 for accessing the interior 82 of the body 70. In one embodiment, the access port 88 may include an actuator, such as a cannula or protrusion, capable of engaging with the liquid supply cartridge 12, as explained in more detail below. In another embodiment, the access port 88 may include a valve. In an exemplary embodiment, the reservoir 16 may be formed from a suitable engineering plastic by a molding process, for example. Other materials and processes, however, are also possible.

In an exemplary embodiment and in a similar manner, the liquid supply cartridge 12 is configured to be received within and supported by the inner frame 24 of the housing 20. In this regard, the liquid supply cartridge 12 includes a generally rectangular body 90 having a front wall 92, rear wall 94, opposed side walls 96, upper wall 98, and lower wall 100 that collectively define an interior 102 for holding a volume of product. The front and rear walls 92, 94 may be generally arcuate to generally match the arcuate front and rear walls 54, 56 of the inner frame 24. For example, the front and rear walls 92, 94 may have a relatively constant radius of curvature. The radius of curvature may be the same or different between the front and rear walls 92, 94. In an exemplary embodiment, the radius of curvature of the rear wall 94 is greater than the radius of curvature of the front wall 92. Additionally, the width of the side walls 96 may be substantially equal to the distance between the front and rear walls 54, 56 of the inner frame 24 such that the liquid supply cartridge 12 substantially fills the void between the front and rear walls 54, 56. Moreover, the width of the front wall 92 and rear wall 94 may be substantially equal to the width of the respective front and rear walls 54, 56 of the inner frame 24. In one embodiment, the width of the front and rear walls 92, 94 of the liquid supply cartridge 12 may be slightly greater than the respective widths of the front and rear walls 54, 56 of the inner frame 24.

Figure 5:
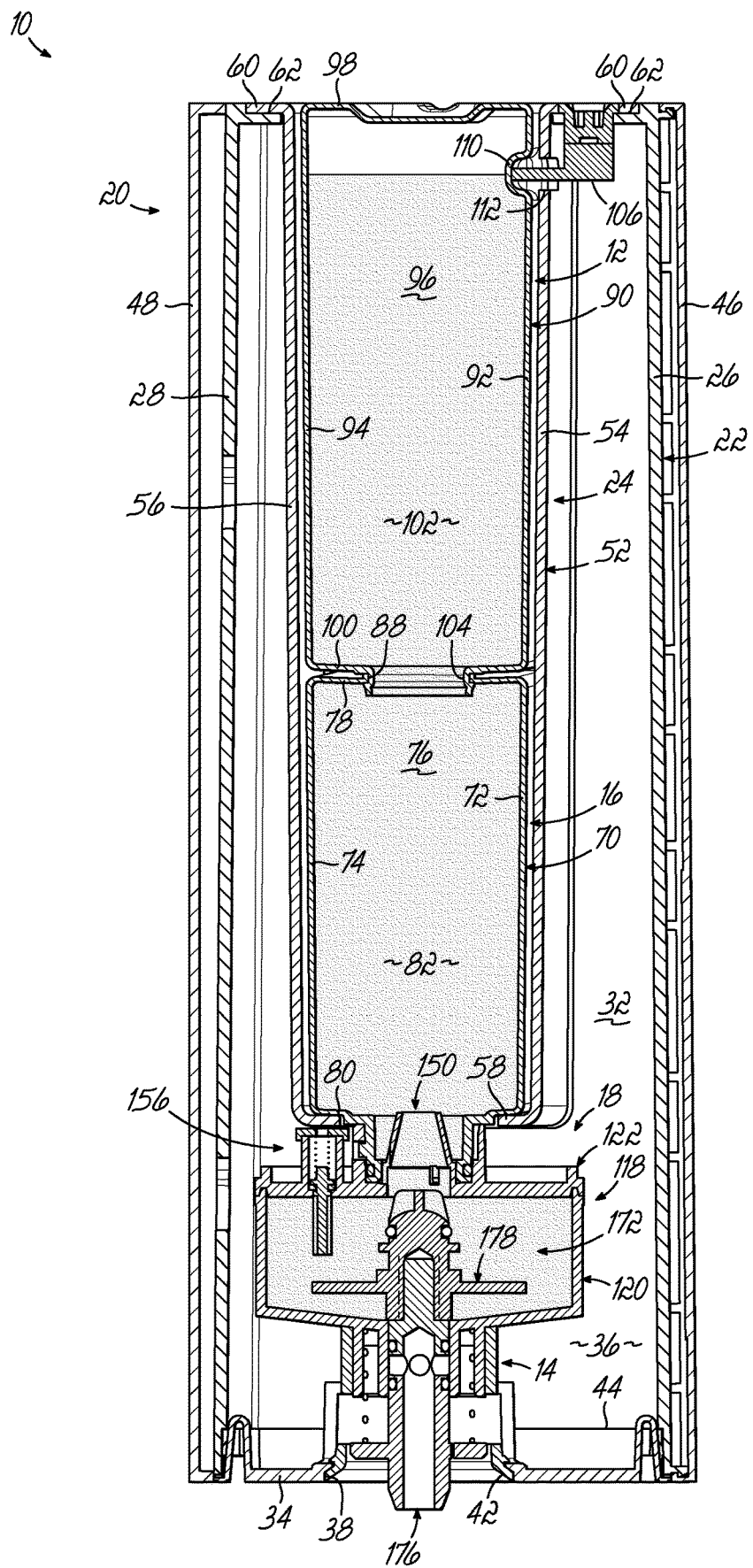
FIG. 5 is a cross-sectional view of the liquid dispenser illustrated in FIG. 1.

The lower wall 100 of the body 90 of the liquid supply cartridge 12 includes a neck 104 extending therefrom that defines a passageway that is open to the interior 102 of the liquid supply cartridge 12. As illustrated in FIG. 5, the neck 104 is sized to be received in the access port 88 in the upper wall 78 of the reservoir 16 and extend therethrough such that the interior 102 of the liquid supply cartridge 12 is in communication with the interior 82 of the reservoir 16 and the lower wall 100 of the body 90 engages against the upper wall 98 of the reservoir 16. In this way, the liquid supply cartridge 12 is supported by the inner frame 24 of the housing 20 and the reservoir 16. The neck 104 of the body 90 may include a seal, such as an O-ring, disposed about the neck 104 for forming a fluid tight seal between the liquid supply cartridge 12 and the reservoir 16 when in communication with each other. The neck 104 of the liquid supply cartridge 12 may include a seal member or valve (not shown) having an opened and closed position. The seal member is normally in the closed position to prevent unwanted leakage from the liquid supply cartridge 12. However, when the liquid supply cartridge 12 is inserted into the housing 20 of the liquid dispenser 10, the seal member is moved to the opened position, such as by engagement with the actuator in the access port 88 of the reservoir 16, and the liquid supply cartridge 12 and reservoir 16 are in communication with each other. In an exemplary embodiment, the liquid supply cartridge 12 may be formed from a suitable engineering plastic by a molding process, for example. Other materials and processes, however, are also possible.

Collectively, the reservoir 16 and the liquid supply cartridge 12 substantially fill the void between the front and rear walls 54, 56 of the inner frame 24 and are arranged in an in-line manner with the liquid supply cartridge 12 positioned generally above the reservoir 16 and in communication with each other. As a result of the in-line arrangement, the product in the liquid supply cartridge 12 passes through the reservoir 16 on its way to being dispensed into the receptacle from the liquid dispenser 10. This is in contrast to many reservoir arrangements, which maintain the product in the reservoir completely separate from the flow path from a main product supply vessel to a dispensing end of a liquid dispenser. Thus, as described in more detail below, product from the liquid supply cartridge 12 being dispensed from the liquid dispenser 10 flows through the reservoir 16. As mentioned above, this arrangement provides the liquid dispenser with multiple sources of the dispensed product.

In one embodiment, the volume of the liquid supply cartridge 12 may be configured to be greater than the volume of the reservoir 16. By way of example, the volume of the liquid supply cartridge 12 may be between about 200 milliliters and about 500 milliliters. In an exemplary embodiment, the volume of the liquid supply cartridge 12 may be about 300 milliliters. The reservoir 16 may be between about 50% and about 90% of the volume of the liquid supply cartridge 12 in various embodiments. In an exemplary embodiment, the reservoir 16 may be about 80% of the volume (e.g., about 240 milliliters) of the liquid supply cartridge 12. It should be appreciated that these values are exemplary, and aspects of the invention are not limited to these numeric ranges. Nor is it necessary that the volume of the reservoir 16 be less than that of the liquid supply cartridge 12. In an alternative embodiment, for example, the reservoir 16 may have the same volume or even a greater volume than that of the liquid supply cartridge 12. Thus, a great many variations in the relative sizes of the reservoir 16 and liquid supply cartridge 12 may exist depending on the particular application.

In one aspect of the invention, and as will be explained in more detail below, the reservoir 16 is configured to remain part of the liquid dispenser 10 while the liquid supply cartridge 12 is configured to be selectively removable from the liquid dispenser 10, such as by a service technician or the like. In this way, for example, when product in the liquid supply cartridge 12 is depleted, the liquid supply cartridge 12 may be removed from the liquid dispenser 10 and replaced with a different or replenished liquid supply cartridge 12. If the liquid supply cartridge 12 is replaced prior to the reservoir 16 running out of product, a continuous supply of product is effectively provided to the liquid dispenser 10 for dispensing into a receptacle. A customer or other user may establish a regular schedule for monitoring the amount of product in the liquid supply cartridge 12 and having the cartridge 12 changed out if necessary. Alternatively, a customer or other user may place a service call as the amount of product in the liquid supply cartridge 12 is running low on product. Other arrangement, schedules and manners of ensuring that the liquid dispenser 10 has a supply of product are also possible. In any event, the inclusion of the reservoir 16 provides additional time to replace an empty liquid supply cartridge 12 while the liquid dispenser 10 remains operational by drawing product from the reservoir 16.

To prevent unauthorized access to the liquid supply cartridge 12 within the liquid dispenser 10, a locking mechanism 106 may be provided. In one embodiment, the locking mechanism 56 may include a locking element or arm movable between a locked position and an unlocked position. For example, a key may be provided for accessing a keyway of the locking mechanism 106 for moving a locking element 108 between the locked and unlocked positions. Only service technicians or the like may have the key for accessing the liquid supply cartridge 12 in the liquid dispenser 10. When the locking element 108 is in the locked position, a portion of the locking element 108 extends into a groove 110 formed in the liquid supply cartridge 12 and prevents the liquid supply cartridge 12 from being removed from the liquid dispenser 10. When the locking element 108 is in the unlocked position, the liquid supply cartridge 12 is free to be removed from the liquid dispenser 10. By way of example, and as illustrated in the figures, the locking mechanism 106 may be positioned in the inner frame 24, and more particularly in the flange 60 of the inner frame 24 adjacent the front wall 54. The front wall 54 of the inner frame 24 includes a slot 112 aligned with the groove 110 in the liquid supply cartridge 12 to allow the locking element 108 to extend through the front wall 54 and into the groove 110 when the locking mechanism 106 is in the locked position. While the locking mechanism 106 is described as being located at the upper end of the liquid dispenser 10, this location is merely exemplary and done for convenience in the replacement process. The locking mechanism 106 may be positioned at different locations on the liquid dispenser 10 and remain within the scope of the present disclosure.

Turning now to the dosing tank 18 and in reference to FIGS. 3-8, this tank includes a generally cylindrical body 118 having a base 120 and a lid 122 coupled to the base 120 and collectively enclosing an interior space or cavity 124. As explained in more detail below, the volume of the interior cavity 124 represents the volume of the product that will be dispensed into the receptacle upon movement of the control valve 14 to the opened position. Thus, the dosing tank 18 meters the amount of product dispensed from the liquid dispenser 10 and into the receptacle upon opening the control valve 14. The volume of the dosing tank 18 can be determined with some certainty such that consistent dispensing of a pre-determined amount of product can be achieved in a robust and inexpensive manner. The dosing tank 18 avoids the complex electronic arrangements typically used to meter a dose of liquid in some conventional dispensers. In one embodiment, the volume of the dosing tank 18 is configured to be considerably less than the volume of the reservoir 16. By way of example and without limitation, the volume of the dosing tank 18 may be between about 20 milliliters to about 80 milliliters. In an exemplary embodiment, the volume of the dosing tank 18 may be about 60 milliliters. In various embodiments, the reservoir 16 may be configured to have a volume between about 3 to about 10 times greater than the volume of the dosing tank 18. In this way, should the product in the liquid supply cartridge 12 run out, the reservoir 16 can continue to supply product to the dosing tank 18 for an additional, but limited, number of doses (e.g., between about 3-10 doses) that will, in turn, allow sufficient time for the liquid supply cartridge 12 to be replenished. It should be recognized that a wide variation in the relative sizes of the dosing tank 18 and reservoir 16 are possible depending on the particular application, for example, and aspects of the invention should not be limited to the values provided above.

The base 120 includes a cylindrical body having a generally circular base wall 126 and a peripheral wall 128 extending from an outer edge thereof that primarily defines the interior space 124. The base wall 126 includes a central aperture 130 for providing an outlet from the interior space 124. The peripheral wall 128 includes a lip 132 at an upper edge thereof for coupling to the lid 122. The base 120 also includes a double-walled extension or nose depending from the base wall 126. The nose includes an inner nose 134 having a passageway in communication with the central aperture 130 and an outer nose 136 coaxially disposed about the inner nose 134 to define an annular gap therebetween. The base 120 may be made from an engineering plastic through, for example, a molding process. Other materials and processes, however, are possible.

The lid 122 includes a generally circular disk-shaped body 138 having a central aperture 140 extending therethrough which generally aligns with the central aperture 130 in the base 120. The disk-shaped body 138 includes an upper surface, a lower surface, and a side surface extending between the upper and lower walls. The upper surface of the lid 122 includes a cylindrical hub 142 extending therefrom and disposed about but spaced from the central aperture 140 to define a radial gap 144. The cylindrical hub 142 is configured to be selectively coupled to the reservoir 16, and more particularly to the neck 84 extending from the lower wall 80 of the reservoir 16. For example, the cylindrical hub 142 may be configured to couple to the key feature 86 on the neck 84 of the reservoir 16. In this regard, the cylindrical hub 142 may include a bayonet-type of keyway 146 (e.g., insert and rotate) for selectively coupling to the key feature 86 on the reservoir 16 and thereby connecting the dosing tank 18 to the reservoir 16 (i.e., suspending the dosing tank 18 from the neck 84 of the reservoir 16). A seal may be disposed in the radial gap 144 to form a fluid tight seal between the dosing tank 18 and the reservoir 16 when coupled together. Moreover, an annular rib 148 may extend from the upper surface of the lid 122 adjacent but spaced inwardly of the outer edge thereof.

In accordance with an aspect of the invention, the liquid dispenser 10 includes a flow restrictor 150 to restrict the flow of product from the reservoir 16 to the dosing tank 18. The purpose of the flow restrictor 150 is to prevent users from dispensing more product than is recommended or required for the application. Due to the presence of the flow restrictor 150, the flow rate of product from the reservoir 16 to the dosing tank 18 is relatively low such that the amount of time to fill the dosing tank 18 (referred to herein as the fill time), is beyond what most users are willing to wait to add more product to their receptacle. For example, and without limitation, the flow restrictor 150 may be configured such that the fill time of the dosing tank 18 is between about 20 seconds to about 90 seconds. Applicant believes that most users are not willing to wait this long to add more product to their receptacle and will move on to performing services without the additional product. Thus, the flow restrictor 150 is configured to encourage proper dosing of liquid (e.g., a chemical) to the receptacle according to posted instructions and/or guidelines. Costs for the dispensed liquids is also reduced due to the discouragement of unnecessary overdosing of the receptacle.

As illustrated in FIGS. 3-8, in an exemplary embodiment, the flow restrictor includes a diffuser 152 having a frusto-conical wall disposed about the central aperture 142 and extending from the upper surface of the lid 122. The diffuser 152 defines a passageway in communication with the central aperture 142. The passageway includes a diverging portion (i.e., in a direction from the reservoir 16 to the dosing tank 18 and a constant diameter cylindrical portion extending from the diverging portion. The diverging portion of the passageway causes the fluid flowing therethrough to decrease in velocity and increase in pressure, i.e., slowing the flow of product into the dosing tank 18. The diffuser 152 further includes one or more (e.g., three) vertical slots 154 through the wall of the diffuser 152 that may provide an additional flow path for product from the reservoir 16 to the dosing tank 16. The vertical slots 154 may also provide a guide and seat function for the control valve 14 when in the release position, as will be described in more detail below.

Figure 6:
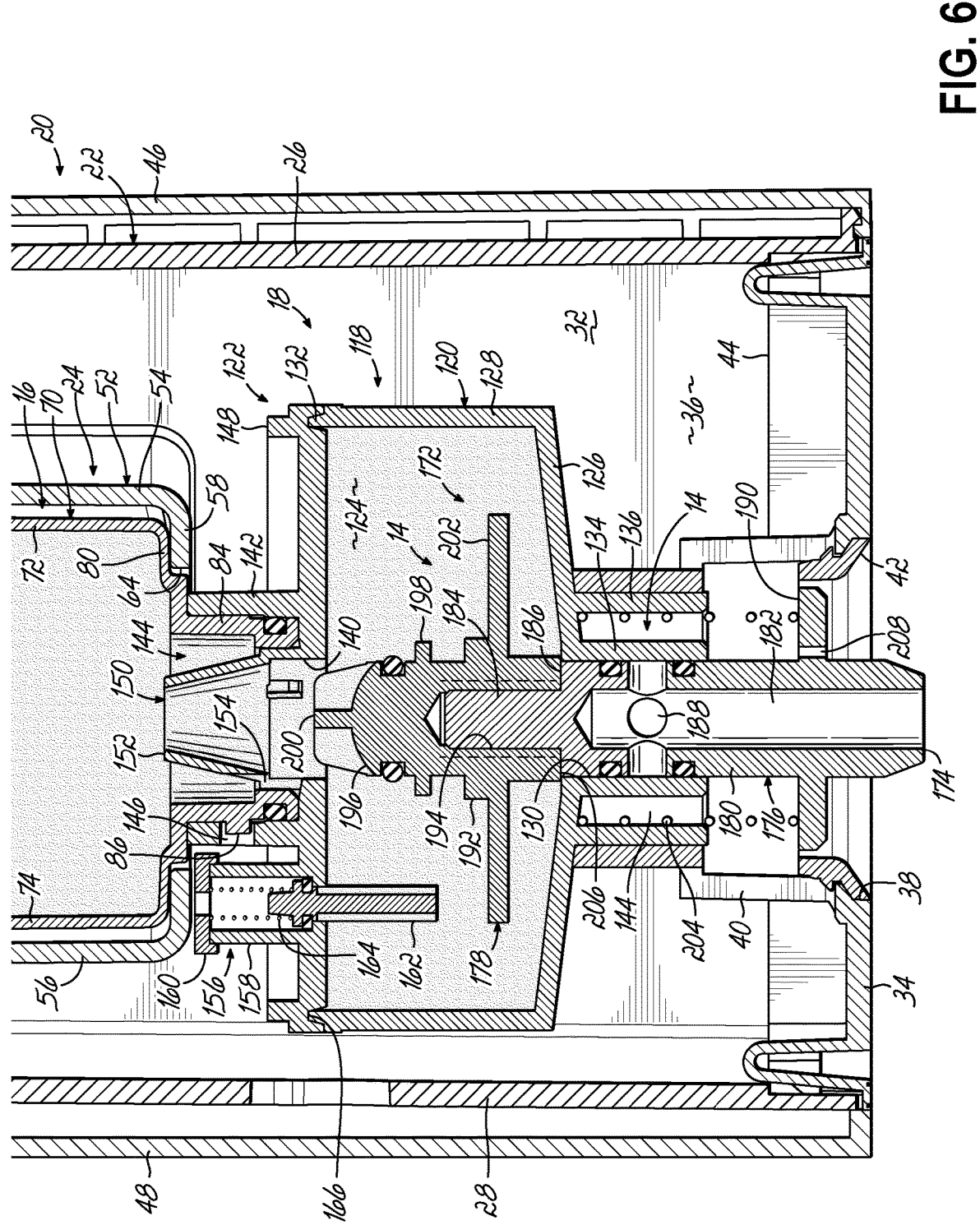
FIG. 6 is a partial enlarged cross-sectional view of the liquid dispenser with the control valve in the closed position and the dosing tank filled with product.
Figure 7:
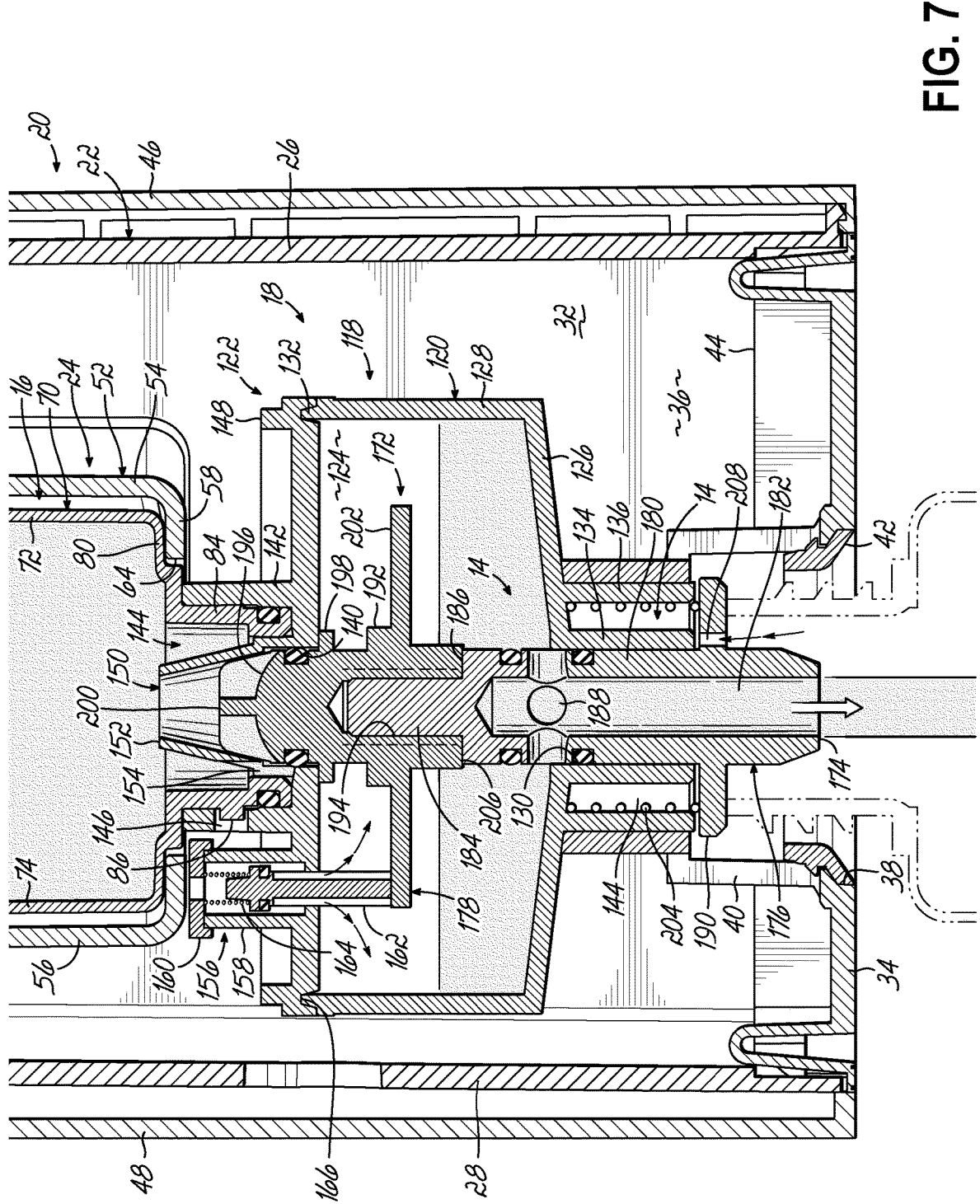
FIG. 7 is a partial enlarged cross-sectional view of the liquid dispenser with the control valve in the opened position and product in the dosing tank being dispensed into a receptacle.
Figure 8:
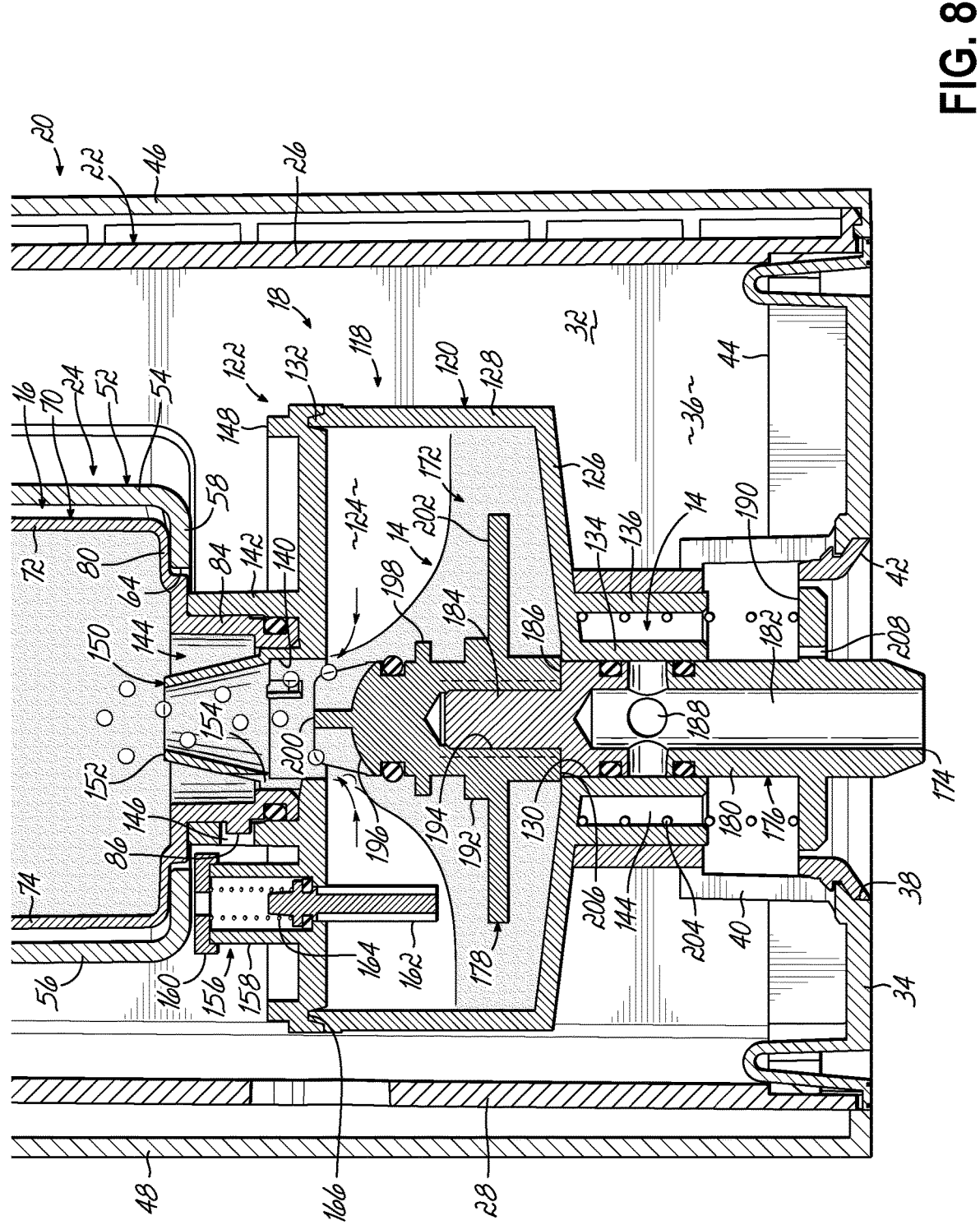
FIG. 8 is a partial enlarged cross-sectional view of the liquid dispenser with the control valve in the closed position and the dosing tank being re-filled with product.

To allow the product in the dosing tank 18 to be dispensed into the receptacle during operation, the dosing tank 18 may include a vent 156 that opens the dosing tank 18 to atmospheric pressure and air. In an exemplary embodiment and as illustrated in FIGS. 6 and 7, the vent 156 includes a vent housing 158 extending from the upper surface of the lid 122 that defines an interior chamber and a removable vent cover 160 that couples to the upper end of the vent housing 158. For example, the vent cover 160 may be selectively retained to the housing 158 by fasteners, such as screws, which are received in respective threaded bores in the vent housing 158. The valve cover 160 further includes one or more holes for allowing air to enter the valve chamber of the housing 158. The vent 156 is radially offset from the central aperture 140 through the disk-shaped body 138 and generally located outboard of the cylindrical hub 142 and inboard of the annular rib 148.

The vent 156 further includes a valve element 162 movable between an opened position and a closed position relative to the valve housing 158. The valve element 162 includes a valve head and a valve stem coupled to and extending from the valve head. The valve head is configured to cooperate with a valve seat defined in the bottom of the valve chamber to prevent air from entering the dosing tank 18 when the valve element is in the closed position. When the valve head is moved away from the valve seat, air is able to enter the dosing tank 18 through the vent 156. The valve stem extends through an aperture in the base wall 126 and extends from the lower wall of the lid 122. As explained in more detail below, the valve stem is configured to engage with a portion of the control valve 14 to move the valve head away from the valve seat and to the opened position of the valve element 162. The vent 156 includes a biasing member 164, such as a spring, positioned in the vent chamber for biasing the valve element 162 toward the closed position. Accordingly, when the portion of the control valve 14 disengages from the valve stem, the valve element 162 moves to the closed position due to an imposed force from the biasing element 164.

The lower surface of the body 138 of the lid 122 is generally planar and includes an annular groove 166 adjacent the outer edge of the body 138. The annular groove 166 is configured to receive the lip 132 at the upper edge of the base 120 when the base 120 and the lid 122 are connected together. The lip/groove connection between base 120 and the lid 122 may provide a snap or friction fit that forms a fluid tight seal for the dosing tank 18. The lid 122 may be made from an engineering plastic through, for example, a molding process. Other materials and processes, however, are possible.

With reference to FIGS. 4-8 the control valve 14 includes a valve element 172 movable between an upper, opened position and a lowered, closed position. When the valve element 172 is in the opened position, liquid in the dosing tank 18 is permitted to flow through the dispenser outlet 174 and into the receptacle positioned generally beneath the liquid dispenser 10. When the valve element 172 is in the closed position, liquid in the dosing tank 18 is prevented from being dispensed from the dispenser outlet 174 and into the receptacle. In accordance with an aspect of the invention, in addition to the valve element 172 interacting with the dosing tank 18 to prevent or permit the flow of product therefrom, the valve element 172 is also configured to interact with the reservoir 16. More particularly, in an exemplary embodiment of the liquid dispenser 10, the valve element 172 is also configured to prevent or permit the flow of product from the reservoir 16 to the dosing tank 18. This interaction will be explained in more detail below. Furthermore, the valve element 172 is further configured to interact with the vent 156 for opening the vent and exposing the dosing tank 18 to atmospheric air and pressure, thereby permitting the product in the dosing tank 18 to flow into the receptacle when the valve element 172 is in the opened position.

In an exemplary embodiment, the valve element 172 has a two-part design including a lower spigot 176 and an upper shuttle 178 removably connected together to form the valve element 172. For example, the spigot 176 and shuttle 178 may be coupled by a threaded connection. Other types of removable connections may also be possible. The spigot 176 includes an elongate tubular body 180 having a first lower end and a second upper end. The lower end of the elongate body 180 defines the dispenser outlet 174. The spigot 176 includes a blind bore passage 182 open to the lower end and extending toward the upper end but being closed off prior to the upper end of the spigot 176. The upper end of the spigot 176 includes a post 184 and an annular abutment ledge 186 for interfacing with the shuttle 178. The spigot 176 further includes one or more ports 188 (e.g., four ports) penetrating through the side wall of the spigot 176 so as to be in communication with the passage 182. The ports 188 are adjacent an upper end of the passage 182 and beneath the annular ledge 186 and post 184. The spigot 176 may include one or more seals, such as O-rings. For example, O-rings may be placed both immediately above and below the ports 188. Other arrangements of the seals may also be possible. An annular engagement plate 190 is positioned adjacent the lower end of the spigot 176 but slightly spaced from the discharge outlet 174. The purpose of the engagement plate 190 will be described below. In an exemplary embodiment, the spigot 176 may be made from a durable material such as metal, for example. Other materials, however, are also possible.

The shuttle 178 includes a tubular body 192 having a first lower end and a second upper end. The shuttle 178 includes a blind bore passage 194 open to the lower end and extending toward the upper end but being closed off prior to the upper end of the shuttle 178. The passage 194 is configured to receive the post 184 of the spigot 176 in, for example, a threaded connection to connect the spigot 176 and shuttle 178. The upper end of the shuttle 178 includes a plug 196 and an annular abutment plate 198 positioned slightly beneath the plug 196. As explained in more detail below, the plug 196 is configured to be received in the diffuser 152 to close off the flow of product from reservoir 16 to the dosing tank 18 when the valve element 172 is in the opened position. The plug 196 includes a generally arcuate head and a Y-shaped tip 200 projecting from the head. The Y-shaped tip 200 is configured to be received in the vertical slots 154 in the diffuser 152 when the valve element 172 is in the opened position. The plug 196 may also include a seal, such as an O-ring for forming a fluid tight seal with the inner wall of the diffuser 152. The shuttle 178 further includes an annular contact plate 202 along the tubular body 192 beneath the plug 196 and adjacent its central or lower region. As explained below, the contact plate 202 is configured to engage with the valve element 162 of the vent 156 for opening the vent 156 and exposing the dosing tank 18 to atmospheric pressure and air.

As illustrated in FIGS. 4-8, the shuttle 178 is received in the interior space 124 of the dosing tank 18 with the plug 196 oriented upwardly toward the lid 122. The spigot 176 is coupled to the lower end of the shuttle 178 and extends through the central aperture 130 and the inner nose 134 such that the engagement plate 190 and the discharge outlet 174 are outside the dosing tank 18 and spaced from the end of the inner nose 134. As noted above, the valve element 172 is movable between an opened position and a closed position. In the opened position, the ports 188 in the spigot 176 are positioned in the interior space 124 of the dosing tank 18 thereby placing the interior space 124 in communication with the discharge outlet 174 of the liquid dispenser 10. Accordingly, product in the dosing tank 18 may flow from the dosing tank 18 through the discharge outlet 174 and into a receptacle adjacent the outlet 174. Additionally, when the valve element 172 is in the opened position, the plug 196 of the shuttle 178 is positioned in the diffuser 152 to occlude the flow of product from the reservoir 16 to the dosing tank 18. Moreover, in the opened position, the contact plate 202 moves the valve element 162 of the vent 156 to the opened position to expose the dosing tank 18 to atmospheric pressure and air. This allows the product in the dosing tank 18 to flow out of the tank and into the receptacle.

In the closed position of the valve element, the ports 188 in the spigot 176 are positioned within the inner nose 134 and the seals adjacent the ports 188 form a fluid tight seal therewith to prevent product in the dosing tank 18 to flow from the tank and dispenser outlet 174. Additionally, when the valve element 172 is in the closed position, the plug 196 of the shuttle 178 is moved away from the diffuser 152 to allow product in the reservoir 16 to flow into the dosing tank 18 and thereby replenish the product in the dosing tank 18. In an exemplary embodiment, the liquid dispenser 10 may include a biasing element 204, such as a spring or the like, for biasing the valve element 172 toward the closed position. For example, a biasing element 204 may be disposed between the dosing tank 18 and the valve element 172. More particularly, in an exemplary embodiment, one end of a spring may be disposed in the annular space 144 between the inner and outer noses 134, 136 and the other end of the spring may engage the engagement plate 190 of the spigot 176.

To arrest the movement of the valve element 172 due to the biasing element 204, the diameter of the shuttle 178 adjacent its lower end may be larger than the diameter of the central aperture 130 of the dosing tank 18 (and the diameter of the spigot 176) to define an annular abutment ledge 206. In the closed position, the abutment ledge 206 contacts the lower wall of the base 120 to prevent any further movement of the valve element 172 in a closing direction. To arrest the movement of the valve element 172 in the opened position, the diameter of the abutment plate 198 on the shuttle 178 may be larger than the central aperture 140 of the lid 122 (and outlet diameter of the diffuser 152) such that the abutment plate 198 contacts the underside of the lid 122 to prevent any further movement of the valve element 172 in an opening direction.

With the various parts of the liquid dispenser 10 outlined above, assembly of the dispenser will now be described. In one embodiment, the assembly process may begin with inserting the inner frame 24 within the outer housing 22 such that the flanges 60 of the inner frame 24 engage the ledges 62 of the outer housing 22 to thereby seat the inner frame 24 within the outer housing 22. At this point, the reservoir 16 may either be positioned in the inner frame 24 prior to placement within the outer housing 22 or subsequent to placement within the outer housing 22. The inner frame 24 may be secured to the outer housing 22 or simply suspended from the outer housing 22 by the flange 60 and ledge 62 engagement. In any event, the inner frame 24 is positioned within the outer housing 22 and the reservoir 16 is positioned therein such that the neck 84 (and key feature 86) of the reservoir 16 extends through the central aperture 64 of the inner frame 24.

In a next step, the dosing tank 16 and control valve 14 may be assembled. In this regard, the vent 156 may be assembled by positioning the valve element 162 in the vent housing 158 such that the valve head is engaged with the valve seat and the valve stem projects below the lid 122. The biasing element 164, such as a spring, may be inserted into the valve housing 158 and the valve cover 160 coupled to the valve housing 158. Next, the shuttle 178 of the valve element 172 may be positioned in the interior space 124 of the base 120 with the plug 196 oriented upwardly and the blind passage 194 aligned with the central aperture 130 of the base 120. The biasing element 204, such as a spring, may have one end inserted into the radial space 144 between the inner and outer noses 134, 136 of the base 120. The spigot 176 may then be inserted into the inner nose 134 such that the upper end of the spigot 176 is positioned within the interior space 124 of the base 120. The biasing element 204 engages the engagement plate 190 to compress the biasing element 204. The spigot 176 and the shuttle 178 may then be coupled together, such as by a threaded connection between the post 184 and the passage 194. The lid 122 of the reservoir 16 may then be coupled to the base 120 by inserting the lip 132 of the base 120 into the annular groove 166 of the lid 122. With this, the dosing tank 18 and the control valve 14 form a subassembly for coupling to the remainder of the liquid dispenser 10.

To achieve this coupling and in a next step, the base wall 34 of the outer housing 22 may be removed (if it is initially coupled to the outer housing 22). For example, the spring clip on the base wall 34 may be actuated to release the base wall 34 from the outer housing 22 and open up the liquid dispenser 10 at its lower end. The subassembly of the dosing tank 18 and the control valve 14 may be inserted through the opening in the outer housing 22 with the removal of the base wall 34. The subassembly may then be orientated such that the keys 86 on the neck 84 of the reservoir 16 engage the keyway 146 on the cylindrical hub 142 of the lid 122 of the dosing tank 18. When the keys 86 so engage the keyway 146 the subassembly may be rotated (e.g., in a bayonet type of connection) to secure the subassembly to the reservoir 16. In essence, the connection between the dosing tank 18 and the reservoir 16 clamps the reservoir 16 and subassembly to the inner frame 24.

With the subassembly coupled to the reservoir 16, the base wall 34 may be attached/re-attached to the outer housing 22 such that the spigot 176 extends through the support tube 40 and central aperture 38 of the base wall 34. For purposes described below, the spigot 176, support tube 40 and central aperture 38 are sized such that there is no seal formed therebetween and the space therebetween may be open to the atmosphere. The lower end of the spigot 176, and more particularly the dispenser outlet 174, is accessible from the lower end of the liquid dispenser 10. But for the liquid supply cartridge 12 being inserted, the liquid dispenser 10 is assembled and ready to be placed into operation in the field. For example, the mounting plate 48 may be attached to a wall or support surface in the field and the liquid dispenser 10 attached to the mounting plate 48.

Operation of the liquid dispenser will now be described. In one embodiment and upon initial use of the liquid dispenser 10, the system may be primed by filling the dosing tank 18 and reservoir 16 with product, such as a chemical. In this way, when a liquid supply cartridge 12 is first coupled to the liquid dispenser 10, a portion of the liquid supply cartridge 12 is not used to initially fill the dosing tank 18 and reservoir 16 (although this scenario is indeed possible). With the dosing tank 18 and reservoir 16 primed, a liquid supply cartridge 12 may be inserted into the outer housing 22. In this regard, the locking mechanism 106 may be moved to the unlocked position, such as with a key. The liquid supply cartridge 12 may then be inserted into the liquid dispenser 10 such that the neck 104 of the liquid supply cartridge 12 engages the access port 88 of the reservoir 16 to thereby place the interior 102 of the liquid supply cartridge 12 into communication with the interior 82 of the reservoir 16. Product in the liquid supply cartridge 12 may then freely flow into the reservoir 16. The locking mechanism 106 may be moved to the locked position, such as by engaging the locking element 108 of the locking mechanism 106 with the groove 110 in the liquid supply cartridge 12.

In one embodiment, janitorial personnel may use the liquid dispenser 10 to dispense product, such as a chemical, into a receptacle, which in many cases takes the form of a spray bottle, for performing cleaning service. It should be recognized, however, that aspects of the invention are not limited to the receptable being a spray bottle. In this embodiment, janitorial personnel engage the upper end of the spray bottle to the lower end of the spigot 176, such as by engaging with the engagement plate 190, and pushing upward against the bias of the biasing element 204 to move the valve element 172 to the opened position. As noted above, when the valve element 172 is in the opened position, the ports 88 of the spigot 176 are open to the interior space 124 of the dosing tank 18, the plug 196 is positioned in the diffuser to occlude product flow from the reservoir 16 to the dosing tank 18, and the vent 156 is opened. This allows the product in the dosing tank 18 to flow through the spigot 176, through the dispenser outlet 174 and into the spray bottle. As the product flows into the spray bottle, the displaced air from the bottle is able to escape to the atmosphere through a vent hole 208 in the engagement plate 190 of the spigot 176 and therefore prevent any back pressure as a result of the liquid dispensing. Alternatively, the engagement plate 190 may include one or more ridges (not shown) configured to engage with the end or mouth of the spray bottle in a manner that provides a gap or opening (i.e., nota sealed engagement) for allowing displaced air in the bottle to escape to atmosphere. Since the flow of product from the reservoir 16 to the dosing tank 18 is cut off when the valve element 172 is in the opened position, only the volume of product that is in the dosing tank 18 may flow into the spray bottle. Accordingly, a precise and repeatable amount of product may be dispensed by liquid dispenser 10 by controlling the volume of the dosing tank 18.

After the flow of product to the spray bottle ceases, the janitorial personnel may move the spray bottle away from the dispenser 10. As the spray bottle is moved away, the valve element 172 is moved from the opened position toward the closed position under the force of the biasing element 204. As discussed above, when the valve element 172 is moved toward the closed position, the ports 88 in the spigot 88 engage the walls of the inner nose 134 and form a fluid tight seal that cuts off the flow of product out of the dosing tank 18. Additionally, the contact plate 202 disengages from the valve element 162 of the vent 156 such that the valve element 162 moves to the closed position, thereby closing off the dosing tank 18 from atmospheric air and pressure. Moreover, the plug 196 disengages from diffuser 152 in the lid 122 of the dosing tank 18, thereby permitting the flow of product from the reservoir 16 to the dosing tank 18.

In this regard, after being evacuated of product due to a dispensing event, the dosing tank 18 is filled with air (from the vent 156). Thus, as product from the reservoir 16 refills the dosing tank 18, the displaced air must escape the dosing tank 18. Because the vent 156 is closed and the lower end of the dosing tank 18 sealed, the air in the dosing tank 100 may escape by going through the central aperture 140 and diffuser 152 in the lid 122. The trapped air then travels through the product in the reservoir 16 and liquid supply cartridge 12 (e.g., as bubbles) and collects at the upper end of the liquid supply cartridge 12. Channeling the air in the dosing tank 18 after a dispensing event through the diffuser 152 may be used in an advantageous manner.

As described above, in many cases users try to increase the dosage of product being added to the receptacle. The diffuser 152 is configured to minimize this from happening by increasing the fill time of the dosing tank 18 from the reservoir 16. In addition, by forcing the air from the dosing tank 18 to flow through the diffuser 152 as the dosing tank 18 is being refilled, the product entering the dosing tank 18 and the air escaping the dosing tank 18 must share the same cross-sectional area of the diffuser 152, which at the end of the diffuser 152 may be quite small (e.g., about 7 millimeter in diameter). Accordingly, not all of the cross-sectional area of the diffuser 152 can be used for moving product into the dosing tank 18. Instead, some of the cross-sectional area is used for the escaping air. This sharing of the cross-sectional space then also decreases the rate at which the dosing tank 18 can be refilled with product after a dispensing event (i.e., longer fill times).

As product is dispensed from the liquid dispenser 10, more and more air is collected in the liquid supply cartridge 12 until all the product in the liquid supply cartridge 12 is depleted. It is noted, however, that although the liquid supply cartridge 12 may be depleted, product remains in the reservoir 16 which can be used to replenish the dosing tank 18 during additional dispensing events. When the liquid supply cartridge 12 is depleted of product, it may be replaced with another cartridge 12 that has a full supply of product (referred to as a new liquid supply cartridge). The new liquid supply cartridge 12 may be the same cartridge that is refilled with product or it may be a different cartridge that has a full supply of product. To replace an empty liquid supply cartridge 12, a service technician may move the locking mechanism 106 to the unlocked position and remove the empty liquid supply cartridge 12 by disengaging the neck 104 of the cartridge 12 from the access port 88 of the reservoir 16 and then disengaging the cartridge 12 from the housing 20 of the liquid dispenser 10. The new cartridge 12 may then be inserted into the housing 20 such that the neck 104 of the new cartridge 12 engages the access port 88 of the reservoir 16. Product in the new liquid supply cartridge 12 is then free to flow into the reservoir 16 and be dispensed by the liquid dispenser 10. The service technician may then move the locking mechanism 106 back to the locked position.

When a liquid supply cartridge 12 is empty, it should be changed out with a new liquid supply cartridge 12 before the product in the reservoir 16 is depleted. In this way, dispensing product from the liquid dispenser 10 is not interrupted by a lack of supply of product to the janitorial personnel. The inclusion of a reservoir 16 provides some additional time to replace the liquid supply cartridge 12 after it is depleted of product. In this way, janitorial services will not be interrupted due to a lack of cleaning products.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. The various features of the invention may be used alone or in numerous combinations depending on the needs and preferences of the user.

What is claimed is:

1. A liquid dispenser for dispensing a product, comprising:

a housing configured to receive a liquid supply cartridge containing the product to be dispensed;

a reservoir disposed in the housing and configured to hold a volume of the product, wherein the reservoir includes an access port for receiving a portion of the liquid supply cartridge and placing the liquid supply cartridge and the reservoir in communication when the liquid supply cartridge is inserted into the housing;

a dosing tank operatively connected to the reservoir and configured to hold a metered volume of the product, wherein the dosing tank comprises a vent having an opened position and a closed position; and a control valve movable between an opened position and a closed position, wherein when the control valve is in the opened position, product in the dosing tank is permitted to flow from a dispensing end of the liquid dispenser and product flow from the reservoir to the dosing tank is prevented, and wherein when the control valve is in the closed position, product in the dosing tank is prevented from flowing from the dispensing end and product flow from the reservoir to the dosing tank is permitted.

2. The liquid dispenser of claim 1, wherein the liquid supply cartridge and the reservoir is configured to have an in-line arrangement within the housing such that product from the liquid supply cartridge is configured to flow through the reservoir as product is dispensed by the liquid dispenser.

3. The liquid dispenser of claim 1, wherein the reservoir is configured to supply product to the dosing tank when the liquid supply cartridge is depleted of product.

4. The liquid dispenser of claim 1, wherein the reservoir has a volume greater than the dosing tank such that the reservoir is able to refill the dosing tank with product multiple times before the reservoir becomes depleted of product.

5. The liquid dispenser of claim 1, wherein movement of the control valve from the closed position to the opened position moves the vent between the closed position and the opened position.

6. The liquid dispenser of claim 1, wherein the dosing tank includes a flow restrictor configured to restrict flow of product from the reservoir to the dosing tank when the control valve is in the closed position.

7. The liquid dispenser of claim 6, wherein the flow restrictor includes a diffuser having a diverging configuration in a direction from the reservoir to the dosing tank.

8. The liquid dispenser of claim 1, further comprising providing a bayonet connection between the reservoir and the dosing tank.

9. The liquid dispenser of claim 1, further comprising a locking mechanism having a locked position and an unlocked position, wherein in the locked position the liquid supply cartridge is prevented from being removed from the housing, and wherein in the unlocked position the liquid supply cartridge is removable from the housing.

10. The liquid dispenser of claim 1, wherein the control valve includes a two-part valve element movable between the opened and closed position.

11. The liquid dispenser of claim 10, wherein the two-part valve element comprises:
a shuttle disposed in an interior of the dosing tank; and
a spigot coupled to the shuttle and extending outside the dosing tank, the spigot defining the dispensing end of the liquid dispenser.

12. The liquid dispenser of claim 11, wherein the
shuttle comprises: a tubular body having a first end and a second end;
and
a plug at the first end thereof for occluding flow of product from the reservoir to the dosing tank when the valve element is in the closed position.

13. The liquid dispenser of claim 12, further comprising a blind bore formed in the tubular body open to the second end and extending toward the first end.

14. The liquid dispenser of claim 12, further comprising a contact plate for engaging the vent and moving the vent from the closed position to the opened position with movement of the valve element from the closed position to the opened position.

15. The liquid dispenser of claim 12, wherein the plug includes a Y-shaped tip configured to be received in respective slots in a diffuser when the valve element is in the opened position.

16. The liquid dispenser of claim 12, wherein the spigot comprises: a tubular body having a first end and a second end;
a post at the first end;
a blind bore formed in the tubular body open the second end; and
one or more ports extending through a side wall of the tubular body and in communication with the blind bore, wherein the one or more ports are configured to be disposed in the interior of the dosing tank when the valve element is in the opened position.

17. The liquid dispenser of claim 16, wherein the spigot further comprises an engagement plate adjacent the second end.

18. The liquid dispenser of claim 17, wherein the engagement plate includes a vent hole.

19. The liquid dispenser of claim 1, wherein the housing includes an outer housing and an inner frame received within the outer housing, wherein the inner frame is configured to support the dosing tank, reservoir, and liquid supply cartridge.

20. The liquid dispenser of claim 19, wherein the outer housing has a removable bottom wall for accessing the interior of the housing.

21. A method of dispensing from a liquid dispenser having a liquid supply cartridge and a control valve, the liquid supply cartridge containing a product to be dispensed, and the control valve having an opened position and a closed position, the method comprising:

directing the product from the liquid supply cartridge to a reservoir in the liquid dispenser;
directing the product from the reservoir to a dosing tank in the liquid dispenser, wherein the dosing tank comprises a vent having an opened position and a closed position; and
dispensing a metered dose of product from the dosing tank when the control valve is in the opened position.

22. The method of claim 21, further comprising preventing flow of product from the reservoir to the dosing tank when the control valve is in the opened position.

23. The method of claim 21, further comprising subjecting the dosing tank to atmospheric pressure and air when the control valve is in the opened position.

24. The method of claim 23, wherein movement of the control valve from the closed position to the opened position moves the vent from the closed position to the opened position.

25. The method of claim 21, further comprising, subsequent to dispensing a metered dose of product from the dosing tank, refilling the dosing tank with product from the reservoir.

26. The method of claim 25, further comprising restricting flow of product from the reservoir to the dosing tank during refilling of the dosing tank with product.

27. The method of claim 26, wherein restricting the flow of product further comprises directing the flow of product through a diffuser to increase fill time of the dosing tank.

28. The method of claim 25, directing air in the dosing tank through a flow restrictor, into the reservoir, and into the liquid supply cartridge during refilling of the dosing tank with product.

29. The method of claim 25, further comprising, upon depletion of the product in the liquid supply cartridge, continuing to dispense product from the liquid dispenser using the product stored in the reservoir.

30. The method of claim 21, further comprising, upon depletion of the product in the liquid supply cartridge:
removing an empty liquid supply cartridge from the liquid dispenser; and
inserting a new liquid supply cartridge into the liquid dispenser.

31. The method of claim 30, wherein the removing and inserting steps are performed prior to the product in the reservoir being depleted.

32. The method of claim 30, wherein the liquid dispenser includes a locking mechanism having a locked position and an unlocked position, the method further comprising:
moving the locking mechanism to the unlocked position prior to removing the liquid supply cartridge from the liquid dispenser; and
moving the locking mechanism to the locked position subsequent to inserting the new liquid supply cartridge in the liquid dispenser.

* * * * *